United States Patent [19]

Dann

[11] 3,760,197

[45] Sept. 18, 1973

[54] SELF-OSCILLATING LIMITER

[75] Inventor: Bert H. Dann, Mountain View, Calif.

[73] Assignee: International Video Corporation, Sunnyvale, Calif.

[22] Filed: Jan. 19, 1972

[21] Appl. No.: 218,862

[52] U.S. Cl. .................. 307/237, 307/230, 328/170, 330/30 D, 331/59

[51] Int. Cl. .......................... H03k 5/08, H03b 3/02

[58] Field of Search ..................... 307/237; 331/59, 331/112; 328/168–170; 330/300

[56] References Cited

UNITED STATES PATENTS 2,439,844 4/1948 Davis .................................. 331/59

*Primary Examiner*—John Zazworsky
*Attorney*—Karl A. Limbach et al.

[57] ABSTRACT

A first pair of NPN transistors operate to amplify and limit an input signal. A second pair of NPN transistors, gated on by the first pair, function to provide the circuit output when an input is applied, and function together in conjunction with an RLC tank to oscillcate a predetermined frequency when no input is applied.

6 Claims, 1 Drawing Figure

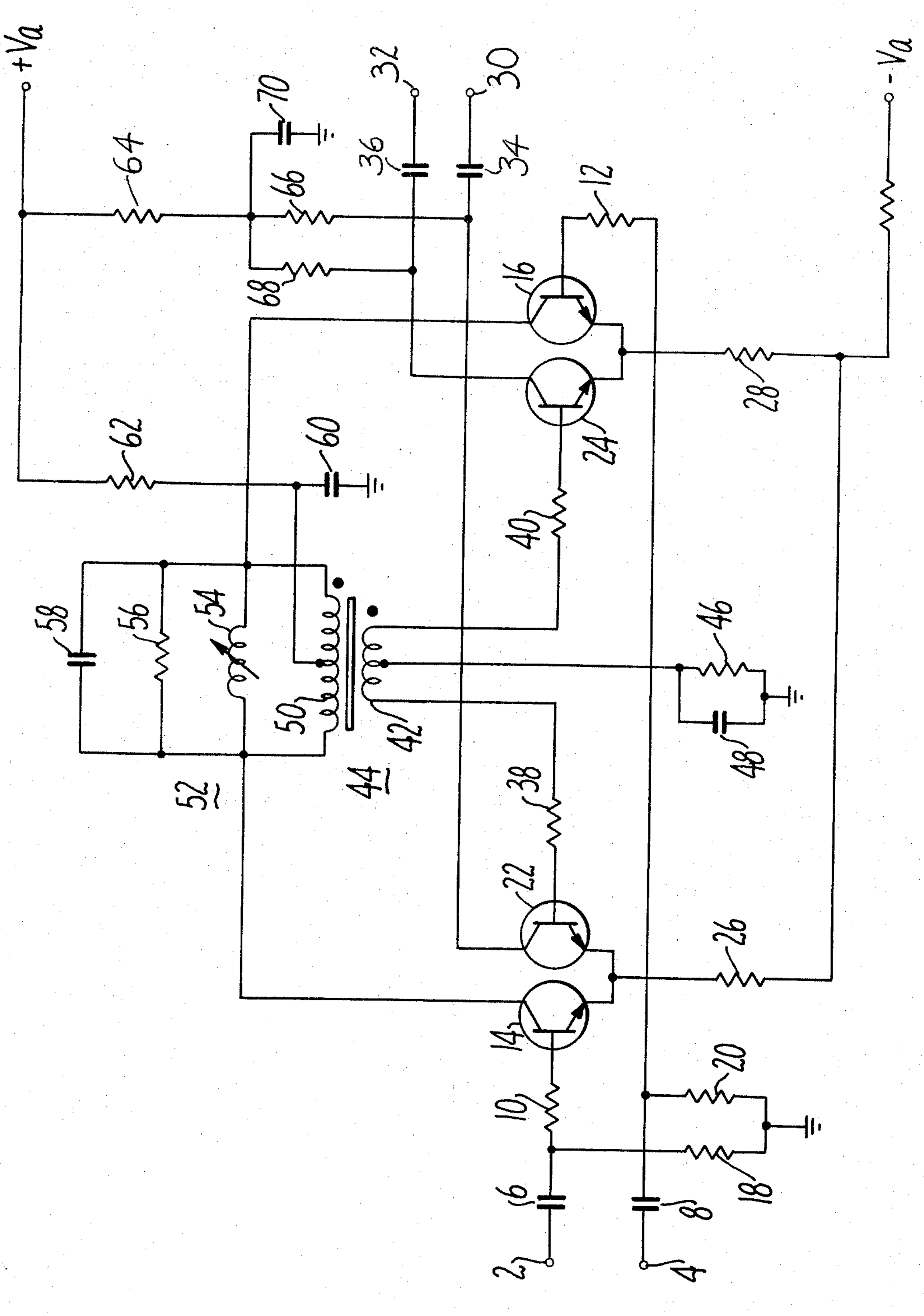
+Va
-Va

SELF-OSCILLATING LIMITER

BACKGROUND OF THE INVENTION

The invention relates generally to a limiter circuit and more particularly to a limiter circuit that goes into self-oscillation at a preselected frequency in the absence of an input signal.

In the processing of video and other types of signals in demodulator systems in television receivers or video tape recorder (VTR) playbacks some limiting or signal clipping is ordinarily required to restrict the amplitude of signal variations.

A frequent problem, particularly in VTR systems, is signal dropout caused by tape imperfection or by loss of signal in a slant track tape format when a head crosses over from one tape edge to another. One prior art approach is to derive a pulse representative of the dropout for application to an amplifier subsequent to the demodulator so that the output signal may be clamped to the video signal blanking level during dropout.

One theoretical approach to the problem is the use of an injection locked oscillator, that is, an oscillator having a nominal free running frequency absent an input signal and an output frequency that follows the frequency of an input signal when present. A severe drawback of such a circuit is its narrow bandwidth which would restrict its usefulness in video applications.

SUMMARY OF THE INVENTION

A push-pull limiter circuit is provided having a pair of transistors acting as an overdriven difference amplifier. Each clips (or limits) as it enters saturation. A second transistor is associated with each limiting transistor in a bidirectional gate arrangement. In the absence of an input signal, the two second transistors comprise an oscillator which may be operated at the video blanking frequency.

BRIEF DESCRIPTION OF THE DRAWINGS

The sole FIGURE is a schematic circuit diagram of an embodiment of the self-oscillating limiter according to this invention.

Referring now to the sole FIGURE, wherein a schematic circuit diagram of an embodiment of the self-oscillating limiter according to this invention is shown having a pair of push-pull input terminals 2 and 4 that apply the input signal as a current to the bases of NPN transistors 14 and 16 via coupling capacitors 6 and 8 and parasitic-suppression resistors 10 and 12, respectively. Bias resistors 18 and 20 are connected between the junctions of capacitor 6 — resistor 10 and capacitor 8 — resistor 12, respectively, and ground. A second set of NPN transistors 22 and 24 have their emitters connected to the emitters of transistors 14 and 16 and through current source resistors 26 and 28 to a negative supply voltage $-v_a$. Alternately, a constant current source could be used in place of resistors 26, 28 and voltage $-v_a$. The collectors of transistors 22 and 24 are connected to output terminals 30 and 32 via output capacitors 34 and 36 respectively. The bases of transistors 22 and 24 are connected through parasitic suppression resistors 38 and 40, respectively, to opposite ends of a tapped winding 42 on transformer 44. A parallel combination of resistor 46 and capacitor 48 is connected between the tap on winding 42 and ground. Resistor 46 — capacitor 48 functions to preserve zero crossing symmetry and is not a bias source. Resistor 46 should be about half the value of resistor 18 or 20. A second winding 50 on transformer 44 is tapped and forms a portion of a four branch parallel resonant RLC circuit 52 comprising a variable incudtor 54, a resistor 56, and a capacitor 58. The ends of RLC circuit 52 are connected to the collector of transistor 14 and 16, respectively. The tap on winding 50 is bypassed to ground by capacitor 60 and is connected to a positive voltage supply $+V_a$ through a decoupling resistor 62. Windings 50 and 42 are phased so that the circuit is noninverting. Voltage source $+V_a$ is also applied to the collector of transistor 22 via decoupling resistor 64 and load resistor 66 and to the collector of transistor 24 via decoupling resistor 64 and load resistor 68. The junction of resistors 64, 66 and 68 is bypassed to ground by capacitor 70.

In operation, assuming positive input to terminal 2 and a negative input to terminal 4, transistor 14 will be on and transistor 16 will be off. If 14 takes all the emitter current it will clip or limit the input signal. If 14 is on, 22 will be gated off and correspondingly 24 is on because 16 is off. As the inputs vary, transistors 22 and 24 will alternately provide a limited and amplified output of the input signal. The base voltages of transistors 22 and 24 will be small and have no effect on the output signal at terminals 30 and 32. Since the oscillator loop gain via the base circuits of transistors 22 and 24 is small, the RLC will have no effect.

In the absence of an input signal, transistors 14 and 16 will conduct alternately on alternate half-cycles of the oscillation frequency determined by the RLC tank. The zero-to-small input signal is overriddden by the base swings of transistors 22 and 24 due to oscillator action. Thus the output at 30–32 is that of the free-running oscillator which ordinarily would be chosen to run at the video blanking frequency.

For intermediate values of signal input a part amplifier, part oscillator condition occurs. It has been found that the transition between the two extreme cases is smooth. As transistor 14 and 16 begins to conduct due to an input signal the associated transistor 22 or 24 begins to turn off thus tending to break the oscillatory feedback loop.

The circuit thus described functions as both a true limiter amplifier and a true oscillator for the two extremes of input conditions. It is apparaent that the circuit is susceptible to various modifications. For example, the circuit could be single ended instead of push-pull. A push-pull circuit as described provides symmetry in the output signal. Also, the winding 42 could be replaced with a capacitive tape. More specifically, by placing three series capacitors across winding 50, an output may be taken to the bases of transistors 22 and 24 across the middle capacitor.

Typically, the circuit described will be used as one stage in a chain of limiters; usually not the first stage because the input voltage must be higher nor as a last stage because there would be too much crossover noise in the input signal. The circuit would provide a satisfactory second stage.

I claim:

1. Apparatus for providing an amplified and limited output in response to an input signal having an amplitude above a threshold level and for providing an oscillatory output in response to an input signal having an amplitude below said threshold level comprising:

input means for receiving an input signal, means for amplifying and limiting a signal, means connecting said input means to said amplifying and limiting means, means for biasing said amplifying and limiting means off in the absence of an input signal above a threshold level, oscillator means, means response to the conductive state of said amplifying and limiting means for turning on said oscillator means when said amplifying and limiting means is turned off, means for combining the outputs of said oscillator means and said amplifying and limiting means.

2. Apparatus according to claim 1 wherein said oscillator means comprises semiconductor means in a feedback arrangement with an RLC tank circuit.

3. A self-oscillating limiter circuit for the processing of video signals comprising:

a pair of input terminals connectable to receive an input signal, first and second transistors, means for connecting said input terminals to the bases of said first and second transistors, respectively, means for biasing said transistors off in the absence of an input signal above a threshold level, third and fourth transistors, an RLC tank circuit, means for coupling the bases of said third and fourth transistors to said tank circuit, first and second current sources, means for connecting the emitters of said first and third transistors together to said first current source, whereby the conduction state of said third transistor is controlled by said first transistor, means for connecting the emitters of said second and fourth transistors together to said second current source, whereby the conduction state of said fourth transistor is controlled by said second transistor, means for coupling the collectors of said first and second transistors to said RLC tank circuit, means for coupling the bases of said third and fourth transistors to said RLC tank circuit, first and second output terminals, means for connecting the collector of said third transistor to said first output terminal, and means for connecting the collector of said fourth transistor to said second output terminal.

4. Apparatus for providing an amplified output signal in response to an input signal having an amplitude above a threshold level and for providing an oscillatory output in response to an input signal having an amplitude below said threshold level comprising difference amplifier means having first and second inputs and first and second outputs associated with each input, respectively, constant current source means connected to said difference amplifier means, means for applying said input signal to said first input, resonant tank circuit means, means for connecting said resonant tank circuit means in an oscillatory feedback path between said first output and said second input, and means connected to said second output for providing said output signal.

5. The combination of claim 4 further comprising biasing means connected to said first input for establishing a predetermined threshold level.

6. The combination of claim 5 wherein said difference amplifier means comprises a pair of transistors having their emitters connected together to said constant current source means and wherein said first and second inputs are the respective bases of said transistors and said first and second outputs are the collectors of said transistors.

* * * * *